G. E. REINKING.
COMBINED ELECTRIC STOVE AND TOASTER.
APPLICATION FILED JAN. 4, 1916.
1,194,663.
Patented Aug. 15, 1916.
2 SHEETS—SHEET 1.
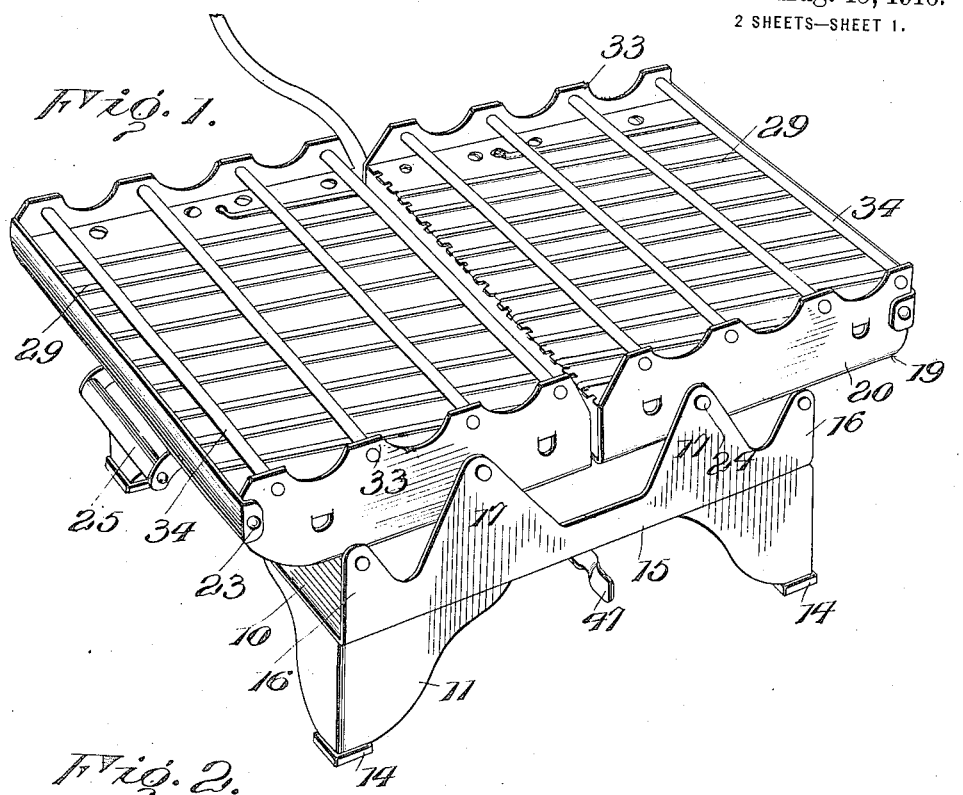
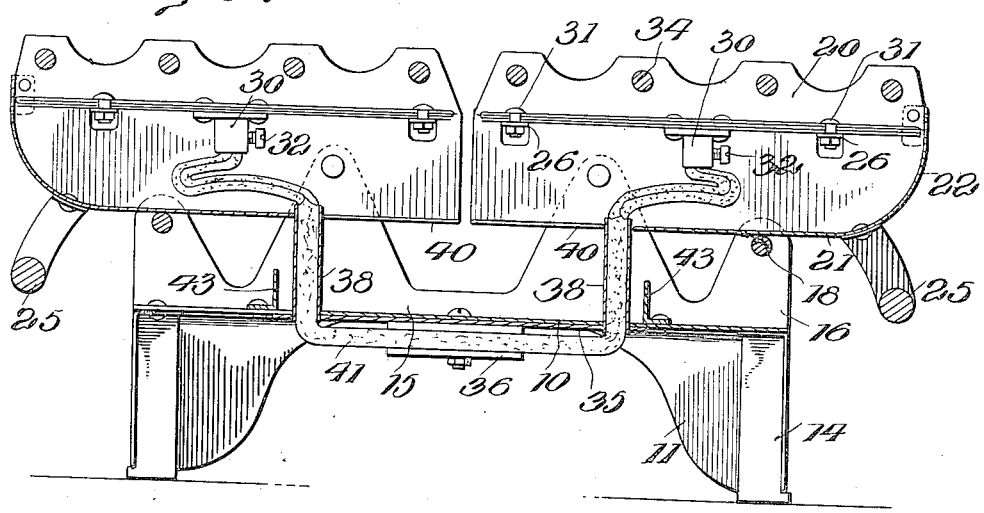
Inventor
G. E. Reinking.
By
Attorneys G. E. REINKING.
COMBINED ELECTRIC STOVE AND TOASTER.
APPLICATION FILED JAN. 4, 1916.
1,194,663.
Patented Aug. 15, 1916.
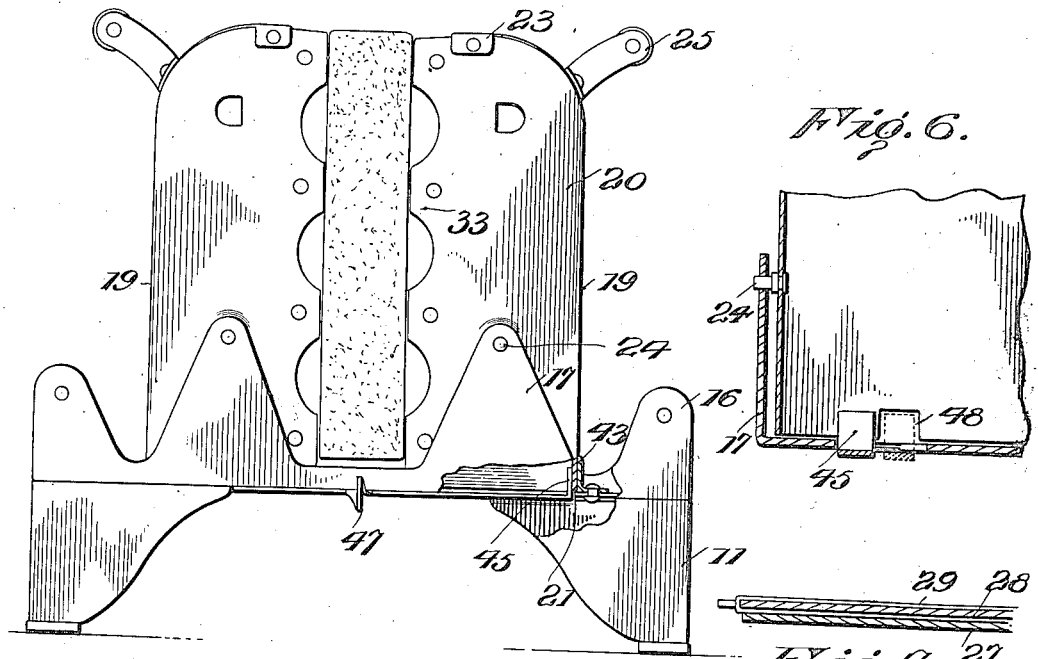
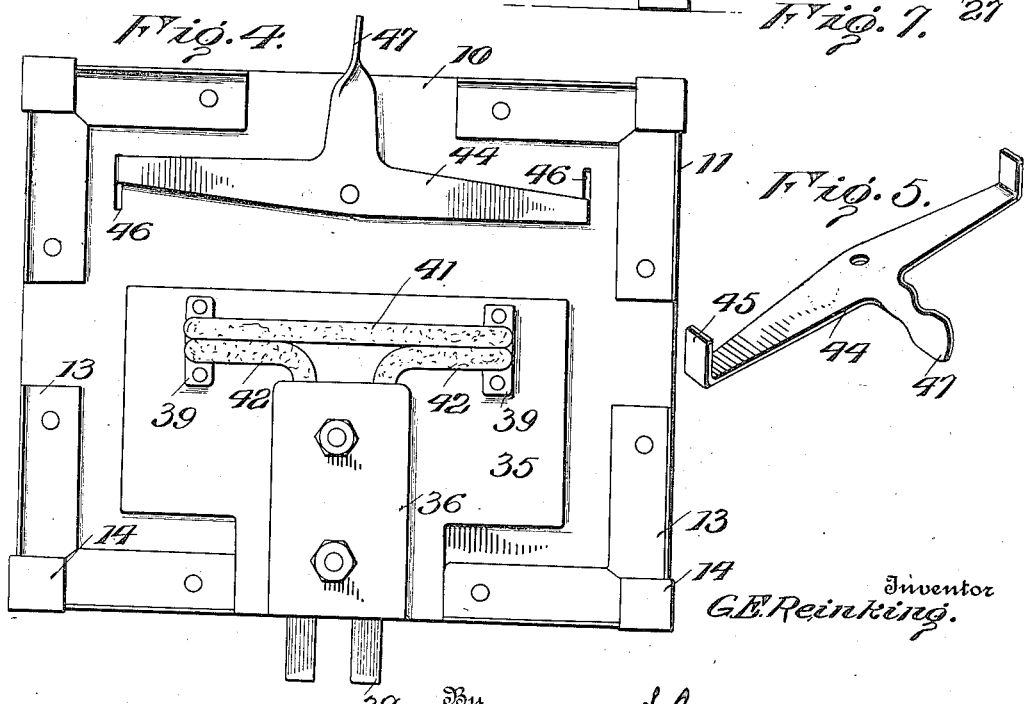

UNITED STATES PATENT OFFICE.

GEORGE E. REINKING, OF FORT WAYNE, INDIANA.

COMBINED ELECTRIC STOVE AND TOASTER.

1,194,663.

Specification of Letters Patent.

Patented Aug. 15, 1916.

Application filed January 4, 1916. Serial No. 70,248.

*To all whom it may concern:*

Be it known that I, GEORGE E. REINKING, a citizen of the United States, residing at Fort Wayne, in the county of Allen and State of Indiana, have invented certain new and useful Improvements in Combined Electric Stoves and Toasters, of which the following is a specification.

This invention contemplates an improved electric stove and has as its primary object to provide a device of this character adapted to provide a heating stove and which may also be used as a toaster.

The invention has as a further object to provide a stove of this character having coacting grate sections which may be moved to horizontal position so that articles may be placed thereon to be heated and wherein the said grate sections may be moved to upstanding position to confront each other for receiving an article of food therebetween, so that the said article may be toasted simultaneously upon opposite sides thereof.

A still further object of the invention is to provide a device of this character wherein the sections of the grate will be limited in their movement in each direction and to also provide means for locking the said sections in upstanding position. And a still further object of the invention is to provide an improved stove of this character which will be thoroughly efficient and which will be of such construction that the completed article may be delivered to the consumer at a reasonable cost.

Other and incidental objects will appear as the description proceeds and in the drawings wherein I have illustrated the preferred embodiment of the invention and wherein similar reference characters designate corresponding parts throughout the several views. Figure 1 is a perspective view of my improved device showing the grate sections of the stove arranged in normal horizontal position, Fig. 2 is a sectional view more particularly illustrating the construction and mounting of said grate sections, Fig. 3 is an elevation partly in section and showing the grate sections of the stove arranged to provide a toaster, Fig. 4 is a bottom plan view of the stove more particularly illustrating the mounting of the lever employed for locking the grate sections of the stove in upright position, as shown in Fig. 3, Fig. 5 is a detail perspective view of the lever detached. Fig. 6 is a sectional view more particularly showing the manner in which the locking lever is adapted to engage the grate sections for holding the said sections in upright position, and Fig. 7 is a fragmentary sectional view more particularly illustrating the mounting of the heating units employed.

In carrying out my invention, I employ a base 10 which may be formed from a piece of suitable resilient sheet metal and is provided at the corners thereof with legs 11. The legs are also each preferably constructed from a piece of suitable sheet metal bent to required shape and provided with flanges 13, as more particularly shown in Fig. 4, seating against the base 10 and secured thereto in any convenient manner. Connected to each of the legs 11, is a foot 14 preferably formed of fiber or other suitable insulating material.

The base 10 is provided with sides 15, which are cut away at their extremities to form pairs of coacting ears 16 and are further provided with spaced pairs of coacting ears 17 which, as will be observed, are longer than the ears 16. Extending between the ears 16 at corresponding extremities of the said side walls, are rods 18, the particular purpose of which will presently appear. Mounted upon the base 10 is a grate which is formed of coacting sections 19. The body portion of each of these sections is preferably formed from a piece of suitable sheet metal bent to provide end walls 20, a bottom wall 21, and an outer side wall 22, the inner sides of the sections being open. Preferably, the outer terminals of the end walls 20 are formed with curved edges as particularly seen in Figs. 1 and 2, and the bottom walls of the said sections, at their outer extremities, are bent to conform to the curvature of the said terminals of the end walls and are provided with lugs 23 secured to the said side walls in any suitable manner. By this arrangement, it will be observed that the body portions of the said sections may be easily and quickly formed. Connected to the end walls 20 of each of the said sections, are coacting trunnions 24 which are arranged adjacent the inner ends of the sections and are received by the pairs of coacting ears 17 respectively to swingingly support the grate sections upon the base 10. By deflecting the said ears, against the resilient action thereof, the grate sections may, if desired, be easily dismounted.

The purpose of the rods 18 will now become apparent since it will be seen that the grate sections 19 will normally pivot upon the ears 17 to assume a position with the bottom wall 21 thereof resting against the said rods with the rods supporting the sections in substantially horizontal position with their inner ends closely confronting each other. The rods 18 thus provide rest rods for the said sections and are adapted to limit the sections in their swinging movement away from each other. Secured to the bottom walls 21 of the sections adjacent the outer extremities thereof are handles 25 which may be grasped for swinging the sections and preferably, these handles are each provided with a grip of some suitable insulating material such as fiber so that the said grips will not become heated.

Mounted upon the end walls 20 of the sections 19 adjacent opposite extremities of the said walls are pairs of coacting laterally projecting lugs or brackets 26, as best seen in Fig. 2. These lugs are preferably struck from the said end walls and project inwardly therefrom. Seating upon the lugs of each of the sections is an insulating plate or member 27. This plate may be formed from a sheet of mica or other suitable insulating material and overlying the plate 27, in each of the sections, is a similar plate 28 provided upon its opposite side edges with a plurality of longitudinally spaced notches. The coacting plates 27 and 28 of each of the sections 19 thus provide partitions within the said sections and are arranged in spaced relation to the bottom walls 21 thereof with the space between the said partitions and the bottom walls of the sections entirely unobstructed. Wound about each of the plates 28 and engaging in the notches formed in the opposite side edges thereof is a heating unit or resistance element 29, preferably formed from a strip of metal or other suitable material. At their extremities, the heating units are respectively carried through the plates 27 and 28 of the sections 19 at points adjacent the end walls of the said sections and are received within suitable sockets or terminals 30 connected to the said plates. Connecting the plates 27 and 28 of each of the sections with the brackets 26 thereof, are a plurality of screws or other suitable fastening devices 31 which extend through the said plates and are detachably engaged with the said brackets. The sockets 30 of each of the sections are also preferably connected to the plates 27 and 28 thereof by screws or other suitable fastening devices and are arranged to depend within the sections toward the bottom walls 21 thereof. Each of the sockets 30 is provided with a binding screw 32.

Attention is now directed to the fact, as most clearly shown in Fig. 7, that the insulating plates 27 of the sections are arranged between the heating units 29 thereof and the bottom walls of the sections, the laps of the heating units upon the under sides of the plates 28 resting upon the said first mentioned plates. The plates 27 will thus tend to minimize downward radiation of heat within the grate sections toward the bottom walls 21 thereof while the partitions defined by the said plates within the grate sections will provide insulating air spaces between the said partitions and the bottom walls of the grate sections tending to further minimize the downward radiation of heat within said sections, these air spaces, as above pointed out, being entirely unobstructed. The bottom walls of the grate sections will thus not become unduly heated to cause the blistering of an article of furniture upon which the stove is placed. It is further to be observed that by removing the screws 31 and disconnecting the sockets 30, the plates 27 and 28 of each of the sections may be readily dismounted so that, should occasion arise, the heating units 29 may be easily renewed.

The outer edges of the end walls 20 of the sections 19 are scalloped to define a plurality of lugs or ears 33 and extending between corresponding lugs of each of the sections are a plurality of rods or grate bars 34. As will now be clear, when the sections 19 of the stove are arranged as shown in Figs. 1 and 2 of the drawings, articles may be placed upon these rods 34 to be supported thereby above the heating units 29. The rods 34 of each of the sections 19 are, it will be observed, arranged in a plane spaced but a short distance away from the heating unit 29 carried thereby so that articles placed upon the said rods will be subjected to the full effect of the heat generated.

Arranged to seat flatly against the under side of the base 10 is an insulating plate or member 35 which may, if desired, also be formed from a sheet of mica or other suitable material. Mounted upon this plate, adjacent the rear side of the base is a sectional plug 36, the sections of which are detachably connected to each other and to the base by bolts or other suitable fastening devices. Projecting from the outer end of the plug, are terminals 37. Connected to the base 10 upon opposite sides of the socket 36 and extending through the base and through the plate 35 are upstanding hollow posts 38. Each of these posts is preferably formed from a piece of suitable sheet metal and at their lower ends, the posts are provided with laterally directed lugs 39 confronting the plate 35 and secured to the base 10 in any suitable manner. The posts 38 at their upper extremities are freely received in suitable slots 40 formed in the bottom walls 21 of the sections 19, these slots opening through the inner edges of the said walls as more particularly shown in Fig. 2. Connecting corresponding terminals of the heating units 29 is a wire 41 which is carried through the posts 38 and beneath the base 10. The terminals of this wire are received within the sockets 30 adjacent the rear side of the stove and are connected to the said terminals of the heating units 29 by the set screws 32 of the said sockets. Leading from the other terminals of the heating units 29 respectively, are wires 42 which are also carried through the posts 38 and are received, at their outer extremities, within the socket 36 to have electrical connection with the terminals 37 while the inner extremities of said wires are received within the sockets 30 adjacent the forward side of the stove and are respectively connected to the said terminals of the heating units 29 by the set screws of the said sockets. Preferably, the wires 41 and 42 are covered with asbestos or other suitable non-combustible insulating material. The terminals 37 are adapted to receive any conventional type of socket for supplying electrical current to the stove and it will now be seen that such current will flow through one of the wires 42 and thence through one of the heating units 29 to be conducted by the wire 41 to the other heating unit whence it will flow through the said last mentioned heating unit and through the other wire 42 to complete the circuit.

Owing to the provision of the slots 40 in the bottom walls 21 of the grate sections 19, the said sections may, as shown in Fig. 3, be swung upon the ears 17 of the base 10 into an upright position relative to the base with the said sections arranged in spaced parallel relation. For limiting the sections in their swinging movement toward each other, the base 10 is provided with spaced parallel stop flanges 43. These flanges may be secured to the base in any suitable manner and extend transversely thereof to engage the inner edges of the bottom walls 21 of the said sections, when the sections are moved upwardly.

Pivotally connected to the base 10 is a locking lever 44 provided at its extremities with laterally directed lugs 45 which are freely received within suitable slots 46 formed in the base 10 and project upwardly through the base to confront the inner faces of the flanges 43. Formed on the locking lever 44 is a suitable handle 47 which projects outwardly from the front side of the stove. The inner edges of the bottom walls 21 of the sections 19 are provided with notches 48 arranged, when the lever 44 is swung to the limit of its pivotal movement in one direction, to freely receive the lugs 45 of the said lever. Consequently, when the sections 19 are swung upwardly to engage the stop flanges 43, the lugs 45 of the locking lever will pass through the notches 48 of the said sections. The locking lever 44 may then be swung to the limit of its pivotal movement in the opposite direction when the lugs 45 of the said lever will engage the inner edges of the bottom walls 21 of the said sections upon opposite sides of the said notches for holding the sections in an upright position. It will therefore be seen that the locking lever 44 may be manipulated to simultaneously release the grate sections 19 of the stove when the said sections will gravitate to rest against the rods 18 as shown in Fig. 2 or may be operated to simultaneously lock the sections in an upright position as shown in Fig. 3. When in this latter position, a piece of bread may be readily placed between the sections to confront the grate rods 34 thereof when the piece of bread may then be quickly toasted upon both sides thereof simultaneously. Consequently, my improved device is not only adapted to provide a heating stove, but may also be readily used as a toaster.

Having thus described my invention, what I claim and desire to secure by Letters Patent is:

1. A device of the character described including a base, coacting grate sections carried thereby, each of said sections being formed to provide end and bottom walls, partitions carried by the end walls of the said sections above the bottom walls to provide insulating air spaces between the partitions and the said bottom walls, heating units mounted upon said partitions, and grate bars extending between the end walls of the sections in spaced relation to said partitions.

2. A device of the character described including a base, upstanding posts carried by the base, coacting grate sections mounted upon the base and having the bottom walls thereof provided with slots freely receiving said posts, heating units carried by the sections, said posts being adapted to receive electrical connection for the said heating units with the sections adapted for movements upon the base to a position confronting each other, and means for locking the said sections in such position.

3. A device of the character described including a base, stop flanges carried thereby, coacting grate sections having notches formed in the bottom walls thereof, the said sections being movable upon the base to upright position confronting each other with the said bottom walls engaging said stop flanges, and a locking member provided with lugs confronting said flanges and adapted to pass freely through said notches, the locking member being shiftable to engage the said lugs with the bottom walls of the said sections for holding the said sections in upright position.

4. A device of the character described including a base, coacting grate sections carried thereby and movable upon the base to a position confronting each other, and manually operable means shiftable upon the base for simultaneously locking the sections in such position.

5. A device of the character described including a base, coacting grate sections carried thereby and movable upon the base to a position confronting each other, and means engaging between the inner extremities of said sections for locking the sections in such position.

6. A device of the character described including a base, stop flanges carried thereby, grate sections shiftable upon the base to a position confronting each other in engagement with said stop flanges, and means coöperating with the said flanges and engaging the said sections for locking the said sections in such position.

7. A device of the character described including a base, stop flanges carried thereby, coacting grate sections shiftable upon the base to a position confronting each other with the said flanges engaging the outer sides of the said sections, and locking means shiftable to engage the inner sides of the sections for holding the sections in such position.

8. A device of the character described including a base, stop flanges carried thereby, grate sections pivotally mounted upon the base and shiftable to a position confronting each other with the said stop flanges engaging the inner extremities of said sections, and a locking lever carried by the base and shiftable thereon to engage at its extremities with the sections to coöperate with the said flanges for holding the said sections in such position.

9. A device of the character described including a base, coacting grate sections carried thereby, heating units carried by the said sections and having electrical connection associated therewith attached to the base, and means carried by the base to project upwardly therefrom into the said sections and receiving said electrical connection with the sections movable relative to the said means to a position confronting each other.

10. A device of the character described including a base, coacting grate sections freely mounted thereon, heating units carried by the said sections and having electrical connection associated therewith attached to the base, and posts projecting upwardly from the base toward the said sections and receiving the said electrical connection.

11. A device of the character described including a base, coacting grate sections carried thereby and movable to a position upon the base with the said sections confronting each other, and rigidly supported means carried by the base for locking the said sections in such position and manually operable to simultaneously release the said sections.

In testimony whereof I affix my signature.

GEORGE E. REINKING. [L. S.]